United States Patent [19]
Sato et al.

[11] Patent Number: 5,076,102
[45] Date of Patent: Dec. 31, 1991

[54] TOOL MONITOR

[75] Inventors: Masanori Sato, Takatsuki; Koichi Tsujino, Kyoto, both of Japan

[73] Assignee: Omron Tateisi Electronics Co., Kyoto, Japan

[21] Appl. No.: 649,298

[22] Filed: Jan. 30, 1991

Related U.S. Application Data

[63] Continuation of Ser. No. 324,746, Mar. 17, 1989, abandoned.

[30] Foreign Application Priority Data

Mar. 24, 1988 [JP] Japan .................................. 63-71592
Dec. 7, 1988 [JP] Japan ................................. 63-310756

[51] Int. Cl.$^5$ ...................... G01N 29/24; G01N 29/26
[52] U.S. Cl. ................................... 73/587; 73/866.5; 340/680
[58] Field of Search ................ 340/680; 73/587, 866.5

[56] References Cited

U.S. PATENT DOCUMENTS

| | | | |
|---|---|---|---|
| 3,956,932 | 5/1976 | Fletcher et al. | 73/189 |
| 4,036,057 | 7/1977 | Morais | 73/587 |
| 4,269,065 | 5/1981 | Clark | 73/587 |
| 4,274,289 | 6/1981 | Weiss et al. | 73/618 |
| 4,326,155 | 4/1982 | Griebeler | 73/587 |
| 4,463,607 | 8/1984 | Hilton | 73/587 |
| 4,495,810 | 1/1985 | Tessarzik et al. | 73/866.5 |
| 4,574,633 | 3/1986 | Ohnuki et al. | 73/587 |
| 4,596,953 | 6/1986 | Nagasaka et al. | 73/622 |
| 4,704,693 | 11/1987 | Thomas | 340/680 |
| 4,761,101 | 8/1988 | Zettl | 340/680 |

FOREIGN PATENT DOCUMENTS 0132858 6/1986 Japan .................................. 73/587

Primary Examiner—Hezron E. Williams
Assistant Examiner—Rose M. Finley
Attorney, Agent, or Firm—Dickstein, Shapiro & Morin

[57] ABSTRACT

The tool monitor according to this invention comprises an acoustic emissions (AE) sensor to be mounted in the neighborhood of and without contact with a machine tool and a tool damage detection means adapted to detect any damage to a tool of the machine tool according to a level of an output AE signal within a predetermined frequency band generated from the AE sensor at the time of occurrence of damage. Since this AE sensor is not in contact with the machine tool spindle, work table or work piece, it is easy to set the sensitivity of the AE sensor and variations in the AE sensor output signal level are minimized. The AE sensor is also effectively protected against flying chips, and noise due to contact with the chips is reduced, thereby minimizing the possibility of erroneous operation.

11 Claims, 6 Drawing Sheets

TOOL MONITOR

This application is a continuation, of application Ser. No. 324,746, filed Mar. 17, 1989, now abandoned.

BACKGROUND OF THE INVENTION

1. Field of the Invention

This invention relates to a tool monitor for detecting any damage to a tool of a machine tool by utilizing acoustic emissions (hereinafter referred to briefly as AE) generated at the time of occurrence of damage.

2. Discussion of the Related Art

In a machine tool such as a drilling machine, a tool such as a drill is often damaged and any such damage must be somehow detected. For the detection of such a tool damage, it is known, for instance, to install an AE sensor in contact with a machine tool near a work piece or a machine table and on a surface receiving an AE signal so that the damage to the tool may be sensed from the AE signal by the AE sensor.

However, many machine tools carry a mechanism for shifting or turning the spindle so that the machining point is often not fixed. Therefore, in such a machine tool, the AE sensor cannot be installed in an effective position. Furthermore, even in the case of a machine tool not having a mechanism for shifting and turning the spindle, the signal level from the AE sensor varies delicately according to the condition of the propagation medium and the state of the contact surface. It is therefore difficult to select the proper position for installation of the AE sensor. In addition, it is difficult to set sensitivity properly. Moreover, machined chips may fly to the AE sensor to cause the output of an erroneous AE signal and an erratic operation of the sensor.

SUMMARY OF THE INVENTION

It is an object of this invention to provide a tool monitor in which an AE sensor signal level is not affected by the condition of the installation surface of the AE sensor. According to this invention, there is provided a tool monitor comprising an AE sensor to be installed without contact with a machine tool in the neighborhood of the tool, and a tool damage detection means adapted to detect any damage to the tool according to the level of the AE signal within a predetermined frequency band as generated at the time of occurrence of the damage.

BRIEF DESCRIPTION OF THE DRAWINGS

The above and other objects, advantages and features of this invention will be more fully understood when considered in conjunction with the following drawings, of which:

FIG. 9 (B) is a longitudinal section view of FIG. 9 (A); and

DETAILED DESCRIPTION OF THE INVENTION

Figure 1:
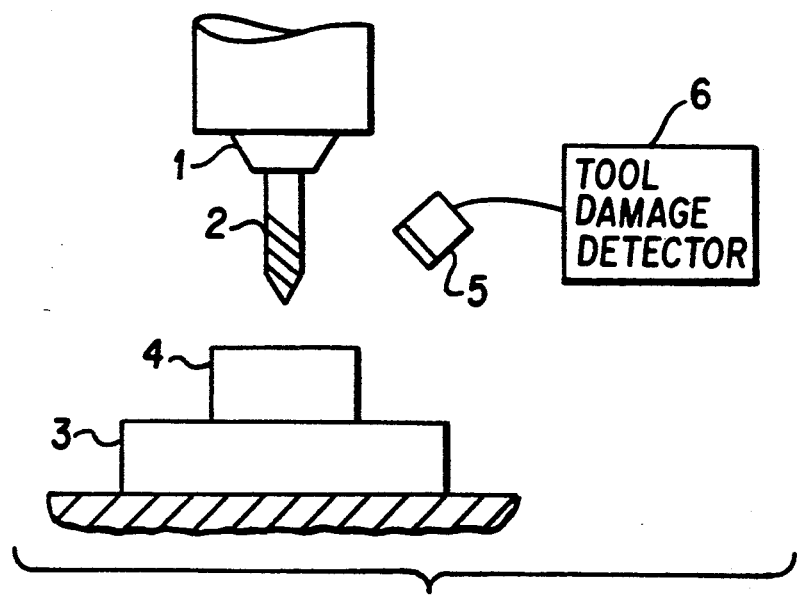
FIG. 1 is a diagrammatic view illustrating a tool monitor according to a first embodiment of this invention.
Figure 2:
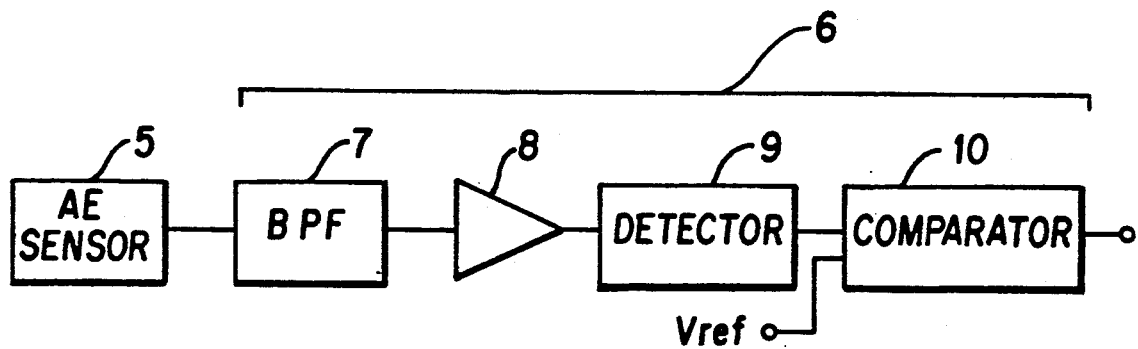
FIG. 2 is a block diagram showing an electrical construction of the tool monitor illustrated in FIG. 1.

Referring to FIG. 1 which illustrates a tool monitor according to the first embodiment of this invention, the reference numeral 1 represents a spindle of a machine tool and the numeral 2 represents a drill mounted on spindle 1. Disposed below the drill 2 is a table 3 on which a work piece 4 is set securely in position. Thus, as the spindle 1 is driven downwards, the work piece 4 is drilled. An AE sensor 5 is disposed facing but without contact with the work piece 4, table 3 or spindle 1. The AE sensor 5 can be designed with a curved reception surface which faces the machining zone. The AE sensor 5 detects an AE signal in a broad frequency band of, for example, about 1 KHz to 1 MHz and its output signal is fed to a tool damage detector 6 (FIG. 2). As shown in the block diagram of FIG. 2, the AE sensor 5 is connected to a band-pass filter 7 adapted to pass signals at, for example, about 200 KHz out of the signals from AE sensor 5 and its output signal is fed to a detection circuit 9 through an amplifier 8. The detection circuit 9 detects the AE signal and converts it to a direct current signal and its output signal is fed to a comparator 10. One input terminal of the comparator 10 is set to a predetermined threshold level Vref and generates a damage detection signal when the output signal from detection circuit 9 exceeds the threshold level Vref.

Thus, in this embodiment, the AE signal can be detected by an AE sensor 5 disposed without contact with the spindle, table or work piece.

Figure 3:
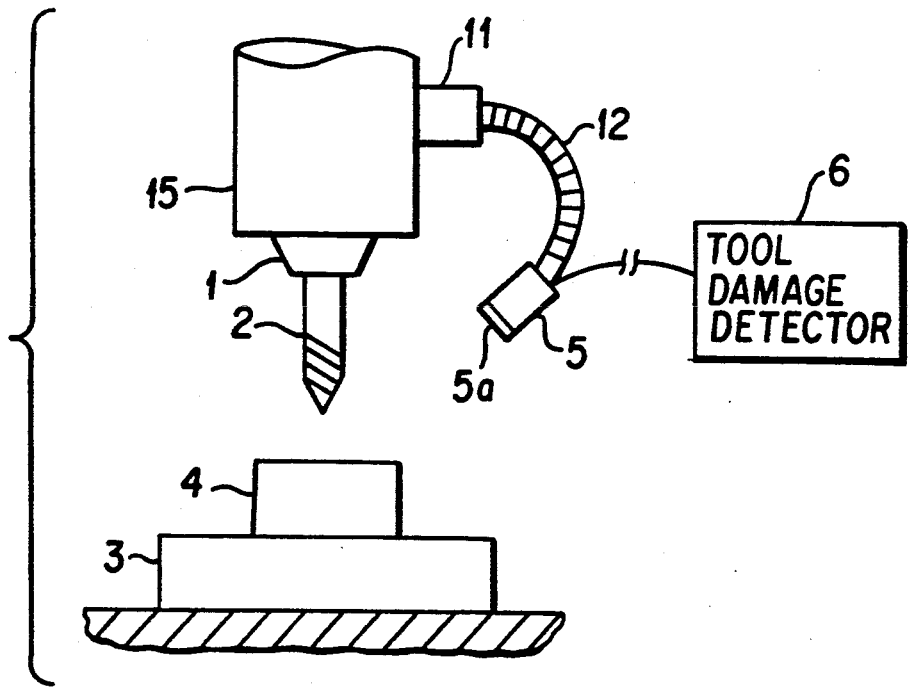
FIG. 3 is a diagrammatic view illustrating a tool monitor according to a second embodiment of this invention.

Referring to FIG. 3 which illustrates a tool monitor according to the second embodiment of this invention, the tool monitor includes a magnet 11 mounted on a spindle head 15 and an AE sensor 5 attached to spindle head 15 via magnet 11 and a supporting mechanism 12. The supporting mechanism 12 is a flexible member which does not conduct the AE signal and which holds the AE sensor 5 with its wave-reception surface 5a facing the machining zone of a drill 2. This embodiment also includes a tool damage detection means 6, as shown in FIG. 2, for processing the AE signal from the AE sensor 5. In this embodiment, however, the AE sensor 5 is connected to the spindle head 15 through the supporting mechanism 12 so that the AE signal generated in the machining zone can always be obtained from the AE sensor even in the case of a machine tool whose spindle head 15 is shifted and turned.

Figure 4:
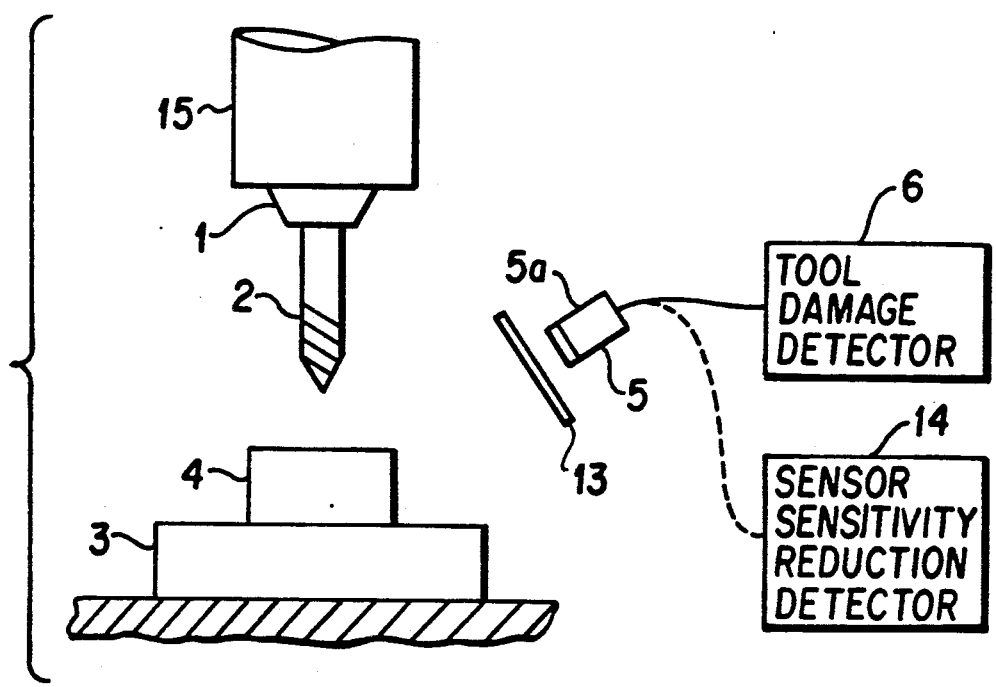
FIG. 4 is a diagrammatic view illustrating a tool monitor according to a third embodiment of this invention.

Referring now to FIG. 4 which illustrates a tool monitor according to the third embodiment of this invention, AE sensor 5 is disposed apart from a spindle head 15 as in the first embodiment. However, this monitor includes a screen 13 facing a work piece 4 which is disposed in front of the AE sensor 5. This screen 13 includes a fine mesh to protect the AE sensor 5 and the waveform reception surface 5a from flying machined chips. In this arrangement, any contact of the AE sensor 5 with the chips is avoided so that the AE signal can be received without noise caused by collision of chips against AE sensor 5. This embodiment also includes a tool damage detection means 6 identical to that of the first embodiment.

In this embodiment, however, chips or dirt can collect on screen 13 which may prevent the AE signal from reaching AE sensor 5. In order to detect any decrease in AE sensor sensitivity which might be caused by chips and dirt accumulating on screen 13, a sensor sensitivity reduction detector 14, schematically indicated by a broken line in FIG. 4, can be employed.

Figure 5:
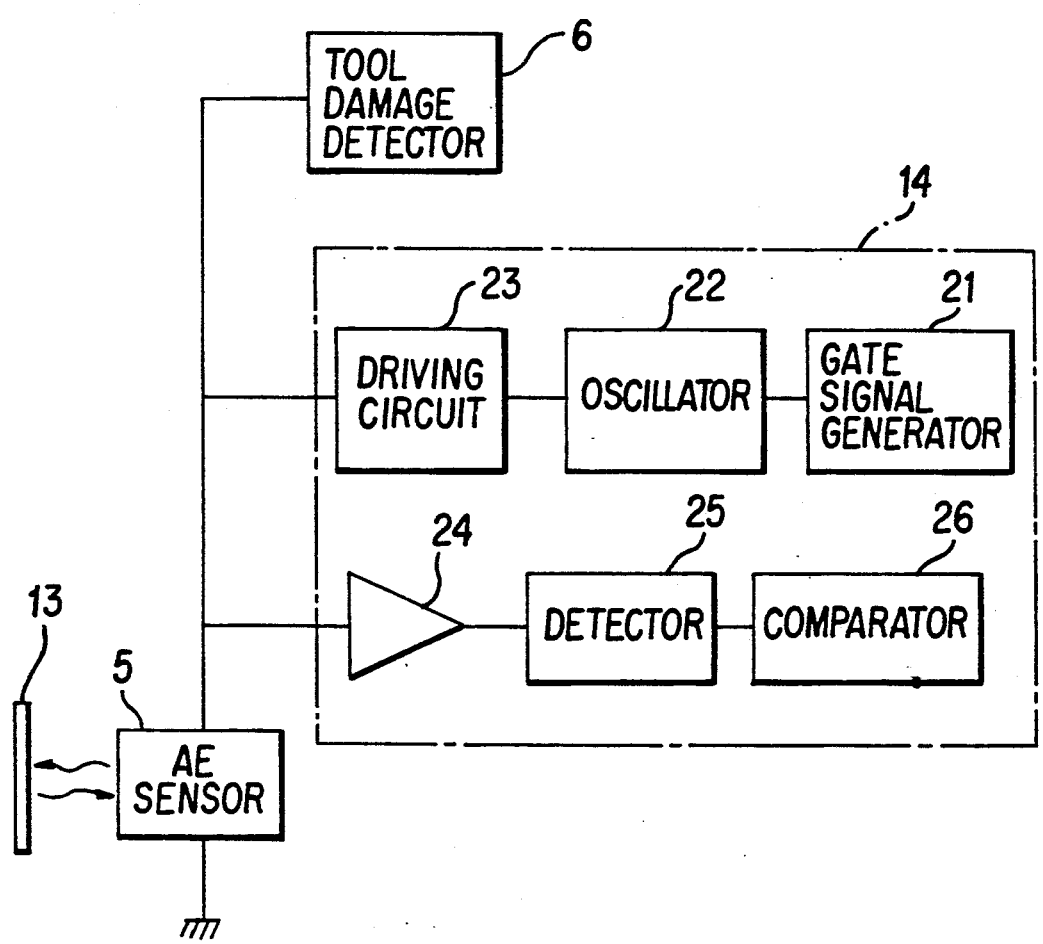
FIG. 5 is a block diagram showing a sensor sensitivity reduction detector.

The sensitivity reduction detector 14 is shown in greater detail in FIG. 5. A gate signal is generated in a gate signal generator 21 at a predetermined cycle to intermittently drive an oscillator 22 which, in turn, outputs a signal with, for example, a frequency of about 200 KHz tuned to the reception frequency characteristics of the AE sensor 5 so as to drive the AE sensor 5 via a driving circuit 23. The AE sensor 5 transmits an AE signal to the screen 13 and detects the reflected wave signal from the screen 13 and feeds it to a detector 25 via an amplifier 24. The detector 25 performs an envelope detection of this signal and feeds its output to a comparator 26. In the comparator 26, when a predetermined threshold level is exceeded, it is determined that the reflected wave signal level has been increased over the threshold, thus indicating an increase in dirt and chips on screen 13 over a desired level and a corresponding reduction in the reception sensitivity of AE sensor 5. Thus, the comparator 26 outputs a signal indicating this decrease in sensor sensitivity. Although, the AE sensor 5 is used as an ultrasonic oscillator in this embodiment, it is also possible to use a transmission and a reception oscillator independent of the AE sensor.

Figure 6:
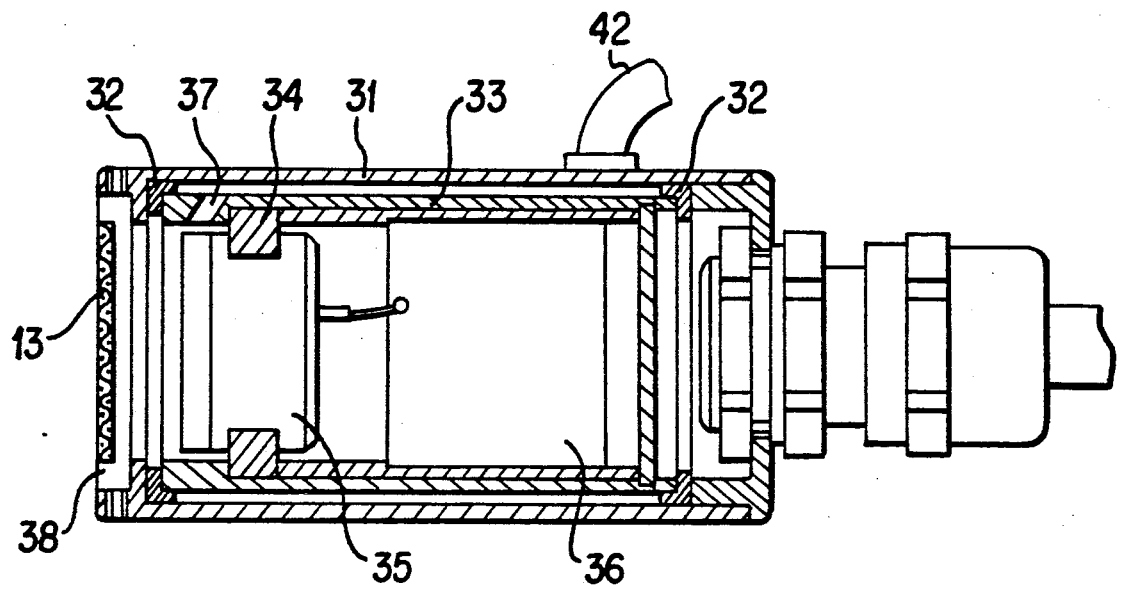
FIG. 6 is a sectional view of the AE sensor illustrated in FIG. 4.

FIG. 6 is a sectional view showing an example of the AE sensor used in the third embodiment. As shown, the AE sensor includes an inner case 33 mounted within an outer housing 31 through a vibration-proof rubber member 32. Held securely within this inner case 33 is a sensor device 35 supported by a sensor-retaining vibration-proof rubber member 34. Connected to the back of the sensor device 35 is a preamplifier 36. In addition, a circular screen holder 38 is disposed around the peripheral edge of said outer housing 31 and a fine-mesh screen 13 is mounted on holder 38.

Figure 7:
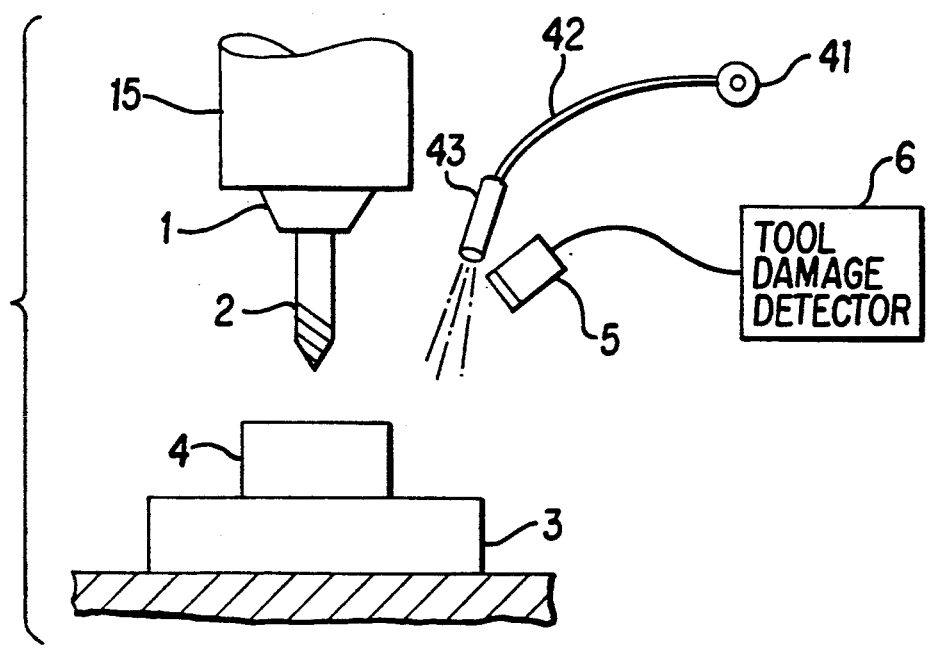
FIG. 7 is a diagrammatic view illustrating a tool monitor according to a fourth embodiment of this invention.

FIG. 7 shows a tool monitor according to the fourth embodiment of this invention. In this embodiment, an air nozzle 43 communicating with a compressed air source 41 via an air supply line 42 is disposed in the neighborhood of the AE sensor 5. During the machining operation, air from the air nozzle 43 is directed generally from the AE sensor to the work piece 4 as shown. By this arrangement, chips and dirt are substantially prevented from reaching the wave reception surface of the AE sensor 5 so that the AE signal can be received without interference by noise. Here, the compressed air source 41, air supply line 42 and air nozzle 43 constitute an air supply means for scattering away the chips from the front of the AE sensor 5. A plurality of air nozzles 43 can be provided around the machining zone. In addition, as shown in FIG. 6, the outer housing 31 of AE sensor 5 can be connected to air supply line 42 and the inner case 33 can be provided with an air passage connected between supply line 42 and opening 37 so that the air from the air source is ejected from around the inner case 33 towards the screen 13 to thereby prevent contact of chips or dirt with the AE sensor.

Figure 8:
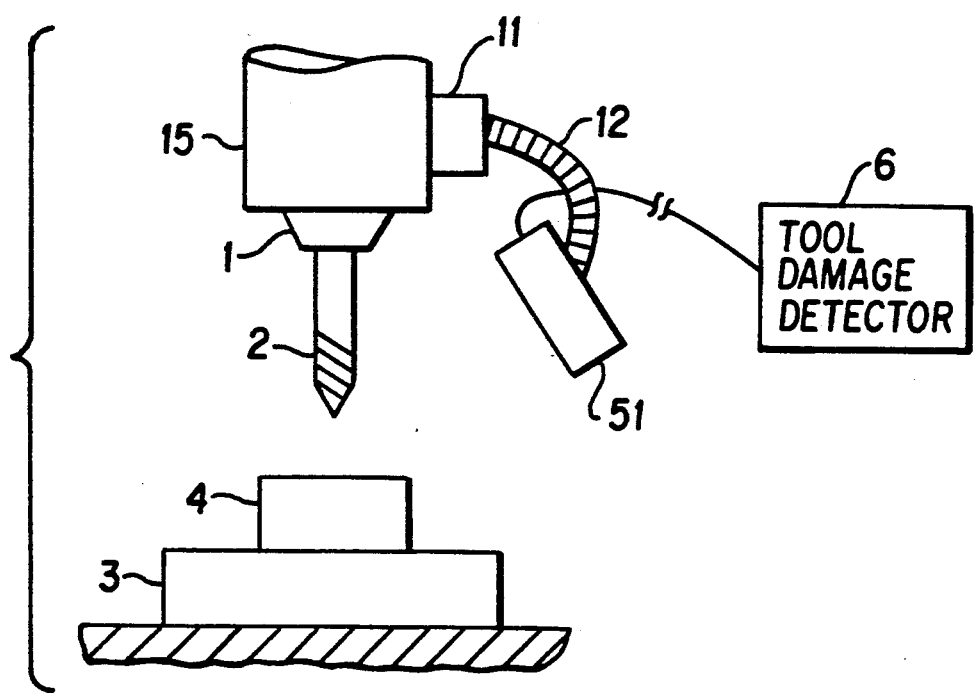
FIG. 8 is a diagrammatic view illustrating a tool monitor according to a fifth embodiment of this invention.
Figure 9A:
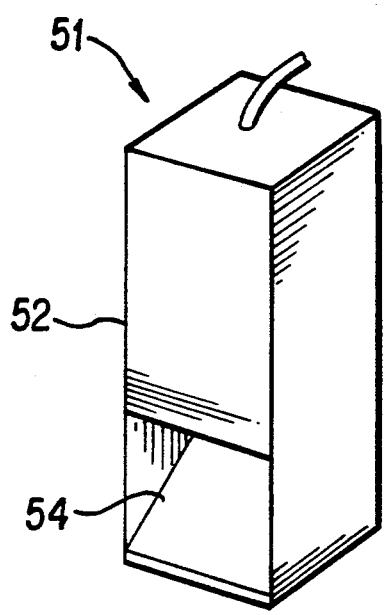
FIG. 9 (A) is a perspective view showing an example of the AE signal reception unit of the AE sensor illustrated in FIG. 8.
Figure 9B:
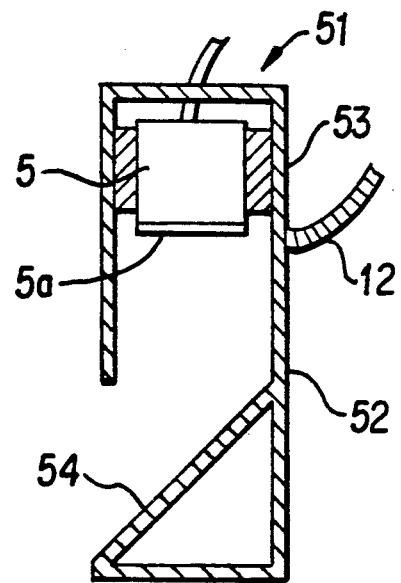

Referring to FIG. 8 which illustrates a tool monitor according to the fifth embodiment of this invention, the spindle head 15 is provided with an AE signal reception unit 51 via a magnet 11 and a supporting mechanism 12 just as in the second embodiment described hereinbefore. As shown in the perspective view of FIG. 9 (A) and the longitudinal section view of FIG. 9 (B), for instance, the AE signal reception unit 51 carries an AE sensor 5 via an elastic securing material 53 within a rectangular housing 52 having a bottom opening. This housing 52 has a reflector 54 in its bottom position. Reflector 54 is adapted to reflect the AE signal and is disposed at an angle of 45 degrees from the bottom plane of the housing. The AE sensor 5 is fixed in position with its wave n surface 5a facing the reflector 54 at an angle of 45 degrees. In this arrangement, the AE signal from the machining zone is propagated to the AE sensor via the reflector 54 of the AE signal reception unit 51. However, chips, oil, dirt, etc. which are scattered during the machining operation may impinge only on the reflector 54 and, as a practical matter, do not reach the wave reception surface 5a of the AE sensor so that the AE signal can be received without interference by the noise generated on contact of the chips and other matter with the wave reception surface 5a. This embodiment also has a tool damage detector 6 which is similar to that of the foregoing embodiments and, therefore, is not described.

Figure 10:
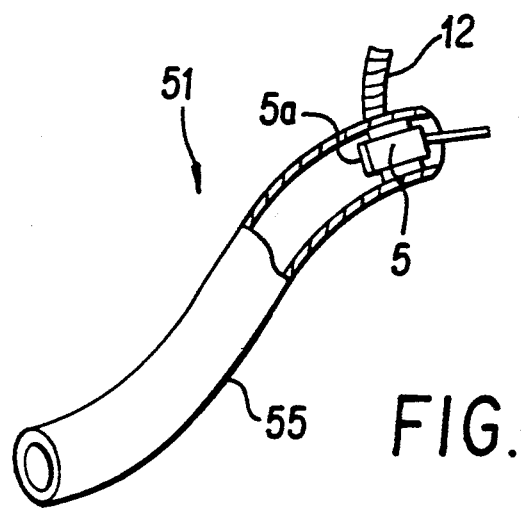
FIG. 10 is a partial section view showing another example of the AE reception unit.

FIG. 10 is a partial section view showing another example of the AE signal reception unit 51. As shown, there is provided a wave propagation duct 55 and the AE sensor 5 is installed within the duct. The wave propagation duct 55 is slightly curved so that chips produced in machining will not reach the wave reception surface of the AE sensor 5. As in the second embodiment, the AE signal reception unit 51 moves and turns along with the spindle head 15, with the result that AE signals can be always obtained from the machining zone even in the case of a machine tool having a spindle that is shifted and turned. Thus, reception of AE signals without the influence by chips, dirt, etc. is assured.

The above description and the accompanying drawings are merely illustrative of the application of the principles of this invention and are not limiting. Numerous other arrangements which embody the principles of the invention and which fall within its spirit and scope may be readily devised by those skilled in the art. For example, although all embodiments of the invention are disclosed as having one acoustic emission (AE) sensor, a plurality of such sensors could be employed. Accordingly, the invention is not limited by the foregoing description, but is only limited by the scope of the appended claims.

We claim:

1. A tool monitor comprising:
   an acoustic emission sensor mounted in a housing in the neighborhood of and out of contact with a machine tool, a workpiece and a machine table, said housing being flexibly supported such that said acoustic emission sensor can be positioned to detect acoustic emissions from a tool of said machine tool when said tool breaks; and
   means responsive to the output signal of said acoustic emission sensor for detecting damage to said tool when the level of said output signal, within a predetermined frequency band, reaches a predetermined magnitude.

2. A tool monitor as in claim 1 wherein said machine tool has an associated spindle head, said tool monitor further comprising a flexible supporting mechanism for magnetically mounting said acoustic emissions sensor to said spindle head such that a wave reception surface of said acoustic emission sensor is directed towards a machining zone in which said tool operates.

3. A tool monitor as in claim 1 further comprising a screen interposed between said acoustic emission sensor and said tool for shielding said acoustic emissions sensor from machining chips generated during operation of said tool.

4. A tool monitor as in claim 3 wherein said acoustic emission sensor is mounted in a housing such that a wave reception surface thereof faces an opening in said housing for receiving acoustic signals therethrough and said screen is mounted to said housing across said opening.

5. A tool monitor as in claim 4 wherein said housing includes an inlet for receiving a pressurized cleaning fluid and a passage for directing said pressurized fluid from said inlet to said screen.

6. A tool monitor as in claim 5 further comprising a source of pressurized air connected to said inlet.

7. A tool monitor as in claim 1 further comprising means for supplying a pressurized fluid to an area in front of a wave reception surface of said acoustic emission sensor to deflect flying debris away from said sensor.

8. A tool monitor comprising:
at least one acoustic emission sensor mounted in the neighborhood of and out of contact with a machine tool, said acoustic emission sensor being positioned to detect acoustic emissions from a tool of said machine tool when said tool breaks;
means responsive to the output signal of said acoustic emission sensor for detecting damage to said tool when the level of said output signal, within a predetermined frequency band, reaches a predetermined magnitude; and
a housing for said acoustic emission sensor, said housing having an opening directed toward said tool, said housing being supported by a flexible supporting mechanism and receiving an acoustic signal through said opening, said acoustic emission sensor being mounted in said housing such that a wave reception surface thereof is directed toward said opening.

9. A tool monitor as in claim 8 wherein said housing includes a reflection surface for directing acoustic signals received through said opening to said wave reception surface of said acoustic emissions sensor.

10. A tool monitor as in claim 8 wherein said housing is in the form of a flexible tube.

11. A tool monitor comprising:
at least one acoustic emission sensor mounted in the neighborhood of and out of contact with a machine tool, said acoustic emission sensor being positioned to detect acoustic emissions from a tool of said machine tool when said tool breaks;
means responsive to the output signal of said acoustic emission sensor for detecting damage to said tool when the level of said output signal, within a predetermined frequency band, reaches a predetermined magnitude;
a screen interposed between said acoustic emission sensor and said tool shielding said acoustic emission sensor from machining chips generated during operation of said tool; and
a sensor sensitivity reduction detector, said sensor sensitivity reduction detector comprising means for generating an acoustic signal, means for applying said acoustic signal to said screen and means for detecting whether a reflection signal from said screen caused by said generated acoustic signal exceeds a predetermined value.

* * * * *